United States Patent [19]

Kretschmer et al.

[11] 4,319,073

[45] Mar. 9, 1982

[54] PUSH-ON END TERMINATION FOR SHIELDED POWER CABLE CONDUCTORS OF SECTOR-SHAPED CONDUCTOR CROSS SECTION

[75] Inventors: Klaus Kretschmer; Peter Tuschy, both of Berlin, Fed. Rep. of Germany

[73] Assignee: Siemens Aktiengesellschaft, Munich, Fed. Rep. of Germany

[21] Appl. No.: 112,691

[22] Filed: Jan. 16, 1980

[30] Foreign Application Priority Data

Feb. 2, 1979 [DE] Fed. Rep. of Germany ....... 2904955

[51] Int. Cl.³ .......................................... H02G 15/068
[52] U.S. Cl. ................................................ 174/73 R
[58] Field of Search .......................... 174/73 R, 73 SC

[56] References Cited

U.S. PATENT DOCUMENTS 3,290,428 12/1966 Yonkers ............................. 174/73 R

FOREIGN PATENT DOCUMENTS

| 7426756 | 5/1975 | Fed. Rep. of Germany | .... 174/73 R |
| 2346567 | 6/1975 | Fed. Rep. of Germany | .... 174/73 R |
| 2746295 | 4/1979 | Fed. Rep. of Germany | .... 174/73 R |
| 7404459 | 10/1974 | Netherlands | ....................... 174/73 R |

OTHER PUBLICATIONS

Anwendungstechnische Mitteilung (Technical Application Information) of the Fed. Rep. of Germany firm Kabel & Draht, entitled "Eigenschaften von Silikonkautschuk als Werkstoff für Aufschiebendverschlüsse der SEHD-Reihe", Apr. 1977.

Prospectus of the Fed. Rep. of Germany firm Kabel & Draht entitled "Innenraum-Endverschlüsse aus Silikonkautschuk für VPE-und PE-Kabel", pp. 7 and 8.

Essay: Schwab, U., "Endgarnituren für Kabel mit Polyäthylen-und vernetzter Polyäthylenisolation", *Elektrotechnik*, No. 3, 1977.

Technische Mitteilungen (Technical Information), AEG-Telefunken 68, 1978, No. 3/4, section 1.6 entitled "Garnituren für Starkstromkabel", p. 170.

*Primary Examiner*—Laramie E. Askin
*Attorney, Agent, or Firm*—Kenyon & Kenyon

[57] ABSTRACT

In order to be able to use a push on termination as an end termination in power cables whose conductors consist of a wire of sector-shaped cross section and a conductor insulation of thermoplastic or crosslinked polyethylene, the end termination is made of silicone rubber of a Shore A hardness of 35 max with the inner bore of the push on termination considerably smaller than the perimeter of the cable conductor, and the wall thickness of the push-on termination smaller than 15 mm.

3 Claims, 2 Drawing Figures

PUSH-ON END TERMINATION FOR SHIELDED POWER CABLE CONDUCTORS OF SECTOR-SHAPED CONDUCTOR CROSS SECTION

BACKGROUND OF THE INVENTION

1. Field of the Invention

The invention relates to shielded power cable fitting in general and more particularly to a push-on end termination for cable conductors of sector-shaped cross section.

2. State of the Art

In order to be able to quickly assemble end terminations to plastic insulated, shielded power cables, in particular cables used in the voltage range from 10 to 30 kV, there have recently been developed prefabricated parts which merely need be pushed onto the appropriately prepared cable end. These include insulating parts made of a silicone rubber or of a synthetic rubber of the ethylene or propylene type in which a field controlling element (deflector) is embedded. The insulating parts, first developed for cable conductors of round cross section, are provided with a bore, the inside diameter of which is smaller than the outside diameter of the cable conductor stripped of the outer conducting layer. When pushing the insulating part on the cable conductor, the former is stretched elastically, thus assuring a firm, electrically safe seat of the push-on termination on the cable conductor.

Such push-on terminations have also been used on conductors of sector-shaped wire and conductor section of the type commonly used in 10 kV cables (Technische Mitteilungen AEG-Telefunken, 68 (1978) No. 3/4, page 170). Considering the sector shape of the cable conductors, however, difficulties are encountered in assuring an all around firm seat of the push-on termination on the cable conductor. To overcome this difficulty, it has been proposed to first apply a shrinkable adapter to the cable end which itself completely adapts inside to the sector-shaped section of the wire or conductor, has a cylindrical outside surface, and onto which a rotationally symmetrical push-on end termination can be pushed. The adapter may consist of a shrinkable part having a cylindrical outside and inside surface, and of nonshrinkable extrusions which adapt themselves to the sector wire or sector conductor and are rounded towards the outside (DE-GM 74 26 756).

SUMMARY OF THE INVENTION

The problem underlying the present invention is to create, for plastic insulated power cable conductors provided with an outer conducting layer and of sector-shaped cross section, an end termination which is of a single piece design, can be pushed on the conductor end, and is in electrically close contact with the conductor surface after assembly.

To solve the problem, the present invention starts from an end termination which consists of a silicone rubber insulating part, has a through bore and a deflector of electrically conducting silicone rubber embedded in it. According to the present invention, the commercial silicone rubber of the insulating part is made to have a Shore A hardness of 35 max., preferably lower than or equal to 30; the circumference of the round inside bore of the insulating part is made smaller by at least 16%, preferably by 19 to 23%, than the outer circumference perimeter of the cable conductor stripped of the outer conducting layer; and the wall thickness of the insulating part, which is of cylindrical or nearly cylindrical shape in the area of the deflector, including the wall thickness of the deflector, is made smaller in this area than 15 mm, preferably smaller than or maximally equal to 10 mm.

Due to the synthetic insulating material used and due to the dimensions chosen, a push-on end termination so designed is elastically stretchable in such a manner that, despite the originally circular inside diameter, the resultant contact pressure against the conductor surface is so great all around after assembly to the sector-shaped conductor that there are no voids between the end termination and the conductor surface.

Regarding the dimensions chosen for the insulating part, the present invention is based on the knowledge that the insulating part when it is being pushed on, must be subjected to a relatively large expansion of at least 20%, preferably 24 to 30% to achieve an all around close contact with the conductor surface despite the sector-shaped conductor section. The feasibility of the insulating part required for this is aided substantially by the relatively thin wall thickness of less than 15 mm. The lower limit for the wall thickness is determined by the contact pressure required and by the insulating part's resistance to deformation (assemblability) and is about 6 to 8 mm in the area of the deflector and about 4 to 6 mm elsewhere.

The mechanical stress to which the insulating part is intended to be subjected due to its dimensions can be obtained over a wide temperature range and over long periods of time, as demanded of electrical cable installations for operating reliability, only from a properly adjusted material that has little hardness, high resistance to permanent deformation and high rupture elongation. The last two characteristics are typical of silicone rubber. A suitable silicone rubber is sold by Wacker Chemie Company under the designation "Silikonkautschuk RIV-ME 622".

The expansion of the insulating part provided within the scope of the present invention when it is assembled to the cable conductor should be at least 20%, preferably 24 to 30%. Particularly good results were obtained with an expansion of about 26%. This means that the inside circumference of the insulating part bore must be about 21% smaller than the outside circumference of the cable conductor stripped of the outer conducting layer.

DETAILED DESCRIPTION OF THE INVENTION

Figure 1:
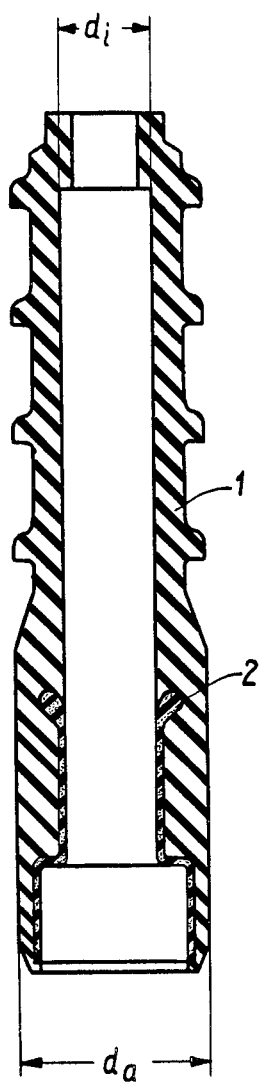
FIG. 1 is a longitudinal cross section through an end termination of the present invention.

FIG. 1 shows, in a longitudinal section, the new end termination consisting of a silicone rubber insulating part 1 with an embedded deflector 2 of electrically conducting silicone rubber. The commercial silicone rubber of the insulating part has a Shore A hardness lower than or equal to 30. In the area of the deflector the insulating part is of cylindrical shape. The outside diameter $d_a$ is 40 mm while the inside bore diameter $d_i$ is 20 mm. This results in a wall thickness of 10 mm and an inside circumference of 62.8 mm.

Figure 2:
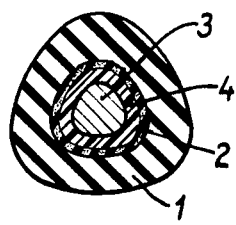
FIG. 2 is a transverse cross section of the end termination of FIG. 1 after being placed on a conductor.

FIG. 2 shows, in a cross section, the end termination pushed on a cable conductor. The cable conductor has a sector-shaped wire 3 and an insulation 4 of thermoplastic or cross-linked polyethylene. The cross section of the wire 3 is 185 mm², and the circumference of the end of the cable conductor stripped of the outer conducting layer is 77 to 80 mm. This results in an expansion of about 25% of the parts 1 and 2 when pushed on the conductor.

In the area in which the deflector 2 is in contact with the conducting layer of the cable conductor, the expansion is somewhat greater.

As to its mechanical properties, the material for the deflector 2 should be matched as far as possible to the properties of the insulating part material. Good results are obtained even with a conducting silicone rubber whose Shore A hardness ranges between 50 and 70. With such hardness ranges, the wall thickness of the deflector, particularly in its cylindrical area contacting the conductor, should be chosen as thin as possible, such as between 0.5 and 2 mm. For pushing the end termination on a cable conductor it is recommended that a suitable, commercial lubricating paste be used.

What is claimed is:

1. A prefabricated push-on end termination for a plastic insulated power cable conductor of sector-shaped cross section of predetermined outside circumference and having an outer conducting layer, comprising:
   (a) a silicone rubber insulating part which has a circular longitudinal bore and in which a deflector of electrically conducting silicone rubber is embedded, said silicone rubber insulating part being made of commercial silicone rubber having a Shore A hardness of 35 max., and preferably less than or equal to 30;
   (b) the circumference of the circular inside bore of the insulating part being smaller by at least 16% than the outside circumference of the cable conductor with which such termination is to be used stripped of the outer conducting layer; and
   (c) the wall of the insulating part being cylindrical or nearly cylindrical in the area of the deflector, and having, in said area, a wall thickness including the wall thickness of the deflector, of less than 15 mm.

2. The push-on end termination of claim 1 wherein said inside bore is smaller by 19 to 23% than the outside circumference of the stripped cable conductor with which said termination is to be used.

3. The push-on end termination of claim 1 or 2 wherein the wall thickness in said area of the deflector is at most equal to 10 mm.

* * * * *